United States Patent [19]

Capps

[11] Patent Number: 5,666,502

[45] Date of Patent: Sep. 9, 1997

[54] GRAPHICAL USER INTERFACE USING HISTORICAL LISTS WITH FIELD CLASSES

[75] Inventor: Stephen P. Capps, San Carlos, Calif.

[73] Assignee: Apple Computer, Inc., Cupertino, Calif.

[21] Appl. No.: 511,904

[22] Filed: Aug. 7, 1995

[51] Int. Cl.$^6$ .............................. G06F 3/00; G06F 15/00
[52] U.S. Cl. .............................. 345/352; 395/768
[58] Field of Search .............................. 395/149, 766, 395/768–769, 155–161, 68, 76, 12, 767, 326–358, 620, 146; 345/146, 902, 173–183

[56] References Cited

U.S. PATENT DOCUMENTS

| | | | |
|---|---|---|---|
| 5,235,679 | 8/1993 | Yoshizawa et al. | 395/156 |
| 5,261,042 | 11/1993 | Brandt | 395/156 |
| 5,367,619 | 11/1994 | Dipaolo et al. | 395/149 |
| 5,367,626 | 11/1994 | Morioka et al. | 395/159 |
| 5,396,264 | 3/1995 | Falcone et al. | 345/146 |
| 5,398,310 | 3/1995 | Tchao et al. | 395/358 X |
| 5,420,975 | 5/1995 | Blades et al. | 395/156 |
| 5,491,495 | 2/1996 | Ward et al. | 395/173 |
| 5,497,455 | 3/1996 | Suga et al. | 395/159 |
| 5,497,484 | 3/1996 | Potter et al. | 395/156 X |
| 5,552,806 | 9/1996 | Lenchik | 345/146 X |
| 5,588,105 | 12/1996 | Foster et al. | 395/326 |

OTHER PUBLICATIONS

Turbo C ++ v3.0, Borland International, 1992, screen pp. 1–10. 1992.

"Timeslips® III for the Mac", 1992 Timeslips Corporation, Essex, MA, 1992 pp. 7–11 through 7–13 and 8–12 through 8–18.

*Primary Examiner*—John E. Breene
*Attorney, Agent, or Firm*—Hickman Beyer & Weaver

[57] ABSTRACT

A data input technique for a computer that provides the user with a historical list of potential choices for the data input is described. A historical list is displayed to the user so that the user can input data by selecting an item from the historical list being displayed. The historical list contains the most recently and/or frequently used data values for the data field that the user is inputting data. Preferably, the historical list is displayed over a form also being displayed that requires the data input into its one or more of its fields. By using the historical lists a user is able to enter data with a greater ease of use than previously obtainable. The historical can also be shared between different applications that execute on the computer system concurrently or at different times. By sharing the data between applications, the historical list becomes more useful and valuable to the user and thereby further improves the ease of use of the computer system. The data input technique can be implemented numerous ways, including as a system, an apparatus, a graphical user interface, or a method, or as a computer readable medium.

26 Claims, 13 Drawing Sheets

ADDRESS BOOK

186 ◆   182 Name : ——184——————   180
187 ◆   188 Address : ——190——————
        192 Company : ——194——————
        196 Phone : ——198——————

FIG. 5A

ADDRESS BOOK

◆ Name : ——184——————   180
◆ Add | Diane Penn    |—200
       | Steve Smith   |
       | Joe M. State  |
◆ Comp | Bill D. Thomas|
       | Mary Kay      |
       | Other         |—201
  Phone : ——————————

| 204 STRING / PTR | 206 TIME | 208 # USES |
|---|---|---|
| Diane Penn | 8/8/95 12:01 | 25 |
| Joe M. State | 8/5/95 18:01 | 3 |
| <ptr to Mary Kay> | 3/3/95 20:19 | 6 |
| Steve Smith | 8/7/95 10:43 | 32 |
| Bill D. Thomas | 7/29/95 7:51 | 1 |

| 212 STRING / PTR | 214 TIME | 216 # USES |
|---|---|---|
| TSI, Inc. | 5/2/95 | 18 |
| SAM Systems | 6/21/95 | 33 |
| <ptr to Apple Computer> | 8/7/95 | 59 |
| First National Bank | 7/8/95 | 9 |
| Hickman & Beyer | 4/9/95 | 2 |

PHONE MESSAGE

Caller : <name> ─314
Phone :
Message :

FAX COVER SHEET

To : <name> ─318
From :
Notes :

SALES INVOICE — 320

Buyer : <company> ─322
Product :
Price :
Quantity :

FIG. 14B

REMINDER BILL — 324

To : <company> ─326
Amount :
Address :

FIG. 14C

GREETING — 328

To : <name> ─332
Company : <company> ─330
Address :
Greeting Type :   ☐ Birthday   ☐ Get Well

GRAPHICAL USER INTERFACE USING HISTORICAL LISTS WITH FIELD CLASSES

BACKGROUND OF THE INVENTION

The present invention relates generally to computer systems, and more particularly to data input techniques for computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required much larger machines a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

Computer systems require user input for one reason or another. The typical input sources are a keyboard, a mouse and a track ball, and in the case of pen-based computers, a stylus. One conventional way of reducing the burden on the user to individually enter or "ink" each character is to provide a list to the user whereby the user need only select one of the list items to thereby cause the data to be entered. These lists are generally arranged in a alphabetical order. Although such lists alleviate the user from having to type in or otherwise enter the data, the data entry process is still burdensome on the user. Namely, if there is a list available, which in many cases there is not, the list is generally too long and requires a substantial amount of time for the user to identify the item to be selected. Also, if the user has waded through the list and not found the desired data, the user becomes frustrated due to the wasted time and effort. Therefore, there is a need for an improved user interface that allows a user to enter data with a greater ease of use.

SUMMARY OF THE INVENTION

Broadly speaking, the present invention is a data input technique for a computer that provides the user with a historical list of potential choices for the data input.

According to the data input technique of the invention, a historical list is displayed to the user so that the user can input data by selecting an item from the historical list being displayed. Preferably, the historical list is displayed over a form also being displayed. The form is an electronic image, typically of some sort of document, to which data needs to be entered into its one or more fields. The user inputs data for a field of the form by selecting an item from the displayed historical list which corresponds to the particular field.

The invention overcomes the problems associated with the prior art by providing the historical list of the most recently and/or frequently used data values for the data field that the user is entering data. The historical list is kept relatively small and the items therein have a reasonable probability of being the data the user desires. In addition to providing a greater ease of use to users, the invention also facilitates the sharing of the historical input data between different applications. By sharing the data between applications, the historical list becomes more useful and valuable to the user and thereby further improves the ease of use of the computer system. The invention can be implemented numerous ways, including as a system, an apparatus, a graphical user interface, or a method, or as a computer readable medium.

As a pen-based computer system, the invention includes an I/O display system including at least an input tablet and a display screen, a memory system for storing program code and data, a CPU for processing the program code in accordance with the data, and a plurality of history tables maintained within the memory system, each of the history tables corresponding to a different field class. When inputting data via the input tablet into a field of a form being displayed on the display screen, a list of choices is produced from the history table for the field class corresponding to the field and displayed on the display screen. Each of the history tables stores historical information concerning usage of data values with respect to a different one of the field classes. Preferably, the list of choices produced from the history table is a menu list of most recently and frequently used data values for the field class.

As a graphical user interface, the invention includes a history list for each of a plurality of field classes, a form having at least one field requiring data input, the field being associated with one of the field classes, and a history list selector for selecting the history list for the field based on the field class associated with the field. Preferably, the history list for each of the field classes is a menu list of most recently and frequently used data values for the field classes. The graphical user interface is useful for any computer system, but is particularly useful for a pen-based computer system because data entry via a stylus is generally more time consuming and burdensome to the user.

As a method for inputting data into a computer system having a display screen associated therewith, the invention includes the operations of: displaying a form on the display screen of the computer system, the form having at least one field requiring data entry by a user; displaying a history list associated with the field on the display screen of the computer system; determining whether the user has selected an item from the displayed history list; assigning a data value for the field to that of a data value associated with the selected item when it is determined that the user has selected an item; and updating the history list in accordance with the selected item when it is determined that the user has selected an item.

As a computer readable medium containing program instructions for inputting data into a computer system having a display screen associated therewith, the invention includes: computer readable code devices for displaying a form on the display screen of the computer system; the form having at least one field requiring data entry by a user; computer readable code devices for displaying a history list associated with the field on the display screen of the computer system; computer readable code devices for determining whether the user has selected an item from the displayed history list; computer readable code devices for assigning a data value for the field to that of a data value associated with the selected item when it is determined that the user has selected an item; and computer readable code devices for updating the history list in accordance with the selected item when it is determined that the user has selected an item.

These and other advantages of the present invention will become apparent upon reading the following detailed descriptions and studying the various figures of the drawings.

BRIEF DESCRIPTION OF THE DRAWINGS

FIGS. 5A and 5B are illustrations of features of the invention which are displayed on a display screen of a computer system;

FIGS. 6A and 6B are exemplary history tables from which history lists can be produced;

FIGS. 13A and 13B are illustrations of usage of the invention across different programming applications; and FIGS. 14A, 14B and 14C are illustrations of another example of the usage of the invention across different applications.

DETAILED DESCRIPTION OF THE PREFERRED EMBODIMENTS

The present invention is a data input technique for a computer that provides the user with a historical list of potential choices for the data input. A historical list is displayed to the user so that the user can input data by selecting an item from the historical list being displayed. The historical list contains the most recently and/or frequently used data values for the data field that the user is inputting data. By using the historical lists a user is able to enter data with a greater ease of use than previously obtainable. The historical list can also be shared between different applications that execute on the computer system concurrently or at different times. By sharing the data between applications, the historical list becomes more useful and valuable to the user and thereby further improves the ease of use of the computer system.

The processing associated with the data input technique according to the invention is discussed in detail below. However, before describing the details of the processing, a computer system for carrying out the processing is described.

The present invention is well suited for pointer based computer systems such as the pen-based, pen-aware, mouse, track ball, and track pad controlled systems that are currently popular. For the purposes of illustration, the invention will be described in connection with a pen-based system; however, the invention is equally applicable to other computer systems.

Figure 1:
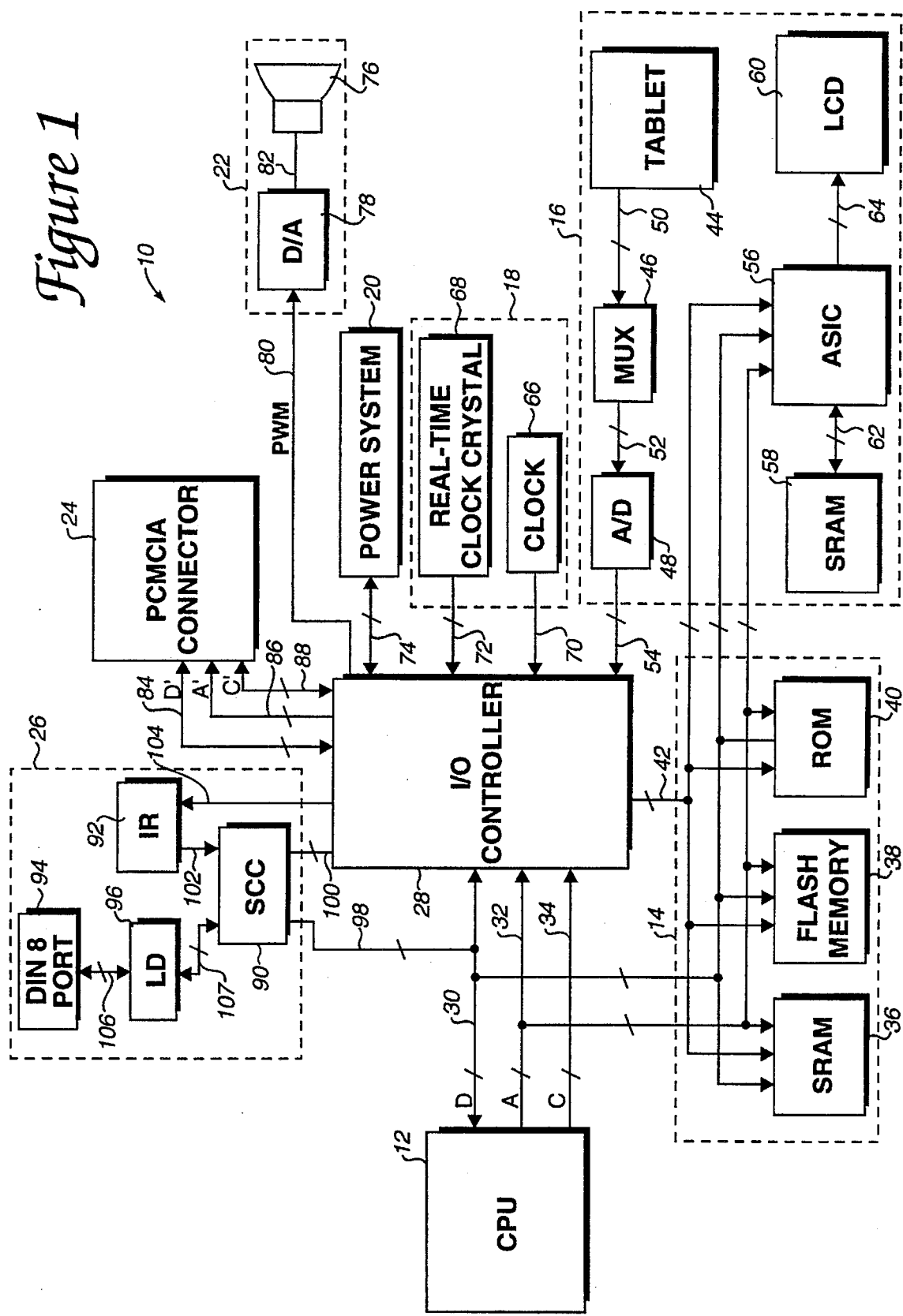
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various, components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England.

The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and read-only memory (ROM) 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system 14 is also coupled to a memory control bus 42 of controller 28. The CPU 12 and controller 28 cooperate to read and write data to the memory system 14 via the busses 30, 32, and 42.

The display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to the controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28. The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count of the total number of seconds that has elapsed since midnight, Jan. 1, 1904 (an arbitrary start time). The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector, etc. The power system 20 preferably controls the power system 20 to conserve power at times of low usage of the pen-based computer system.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
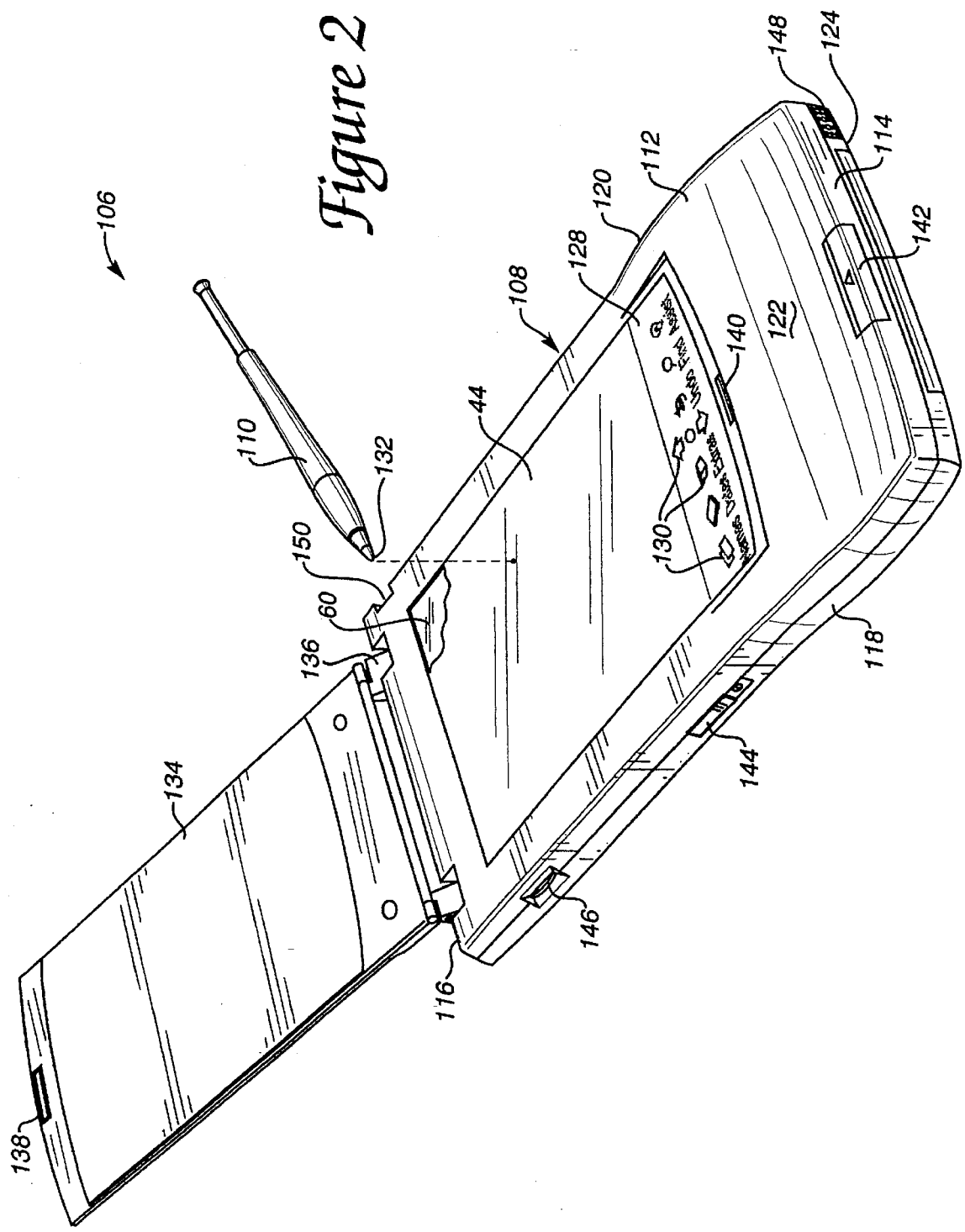
FIG. 2 is a perspective view of a complete pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and a power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110. For example, a fingernail or other pointed object could be used with the tablet 44 of the present invention. Also, there are other types of tablets available that utilize other types of styluses.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
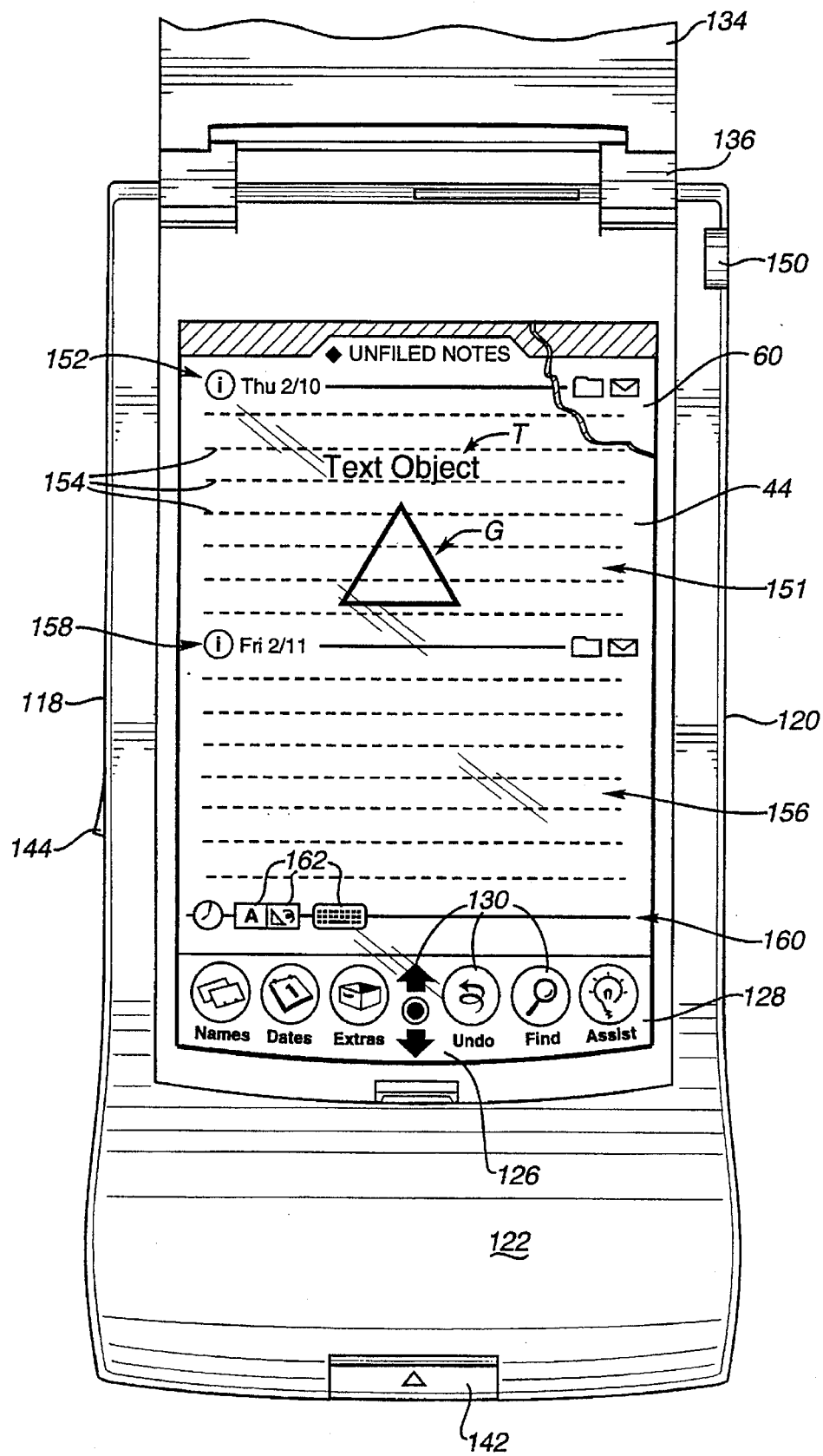
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via the controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in the memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference. The pen based computer system 10 can also run or execute other application programs in a similar fashion.

A status bar 160 is provided at the bottom of the notepad application. The status bar 160 is provided with a number of active areas and a number of display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III,* by C. Rose et at., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related U.S. patent application Ser. No. 07/976,970 filed Nov. 16, 1992, U.S. Pat. No. 5,588,105, on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art. In any case, the processes of the present invention are discussed in detail below with reference to FIGS. 4–14C.

Figure 4:
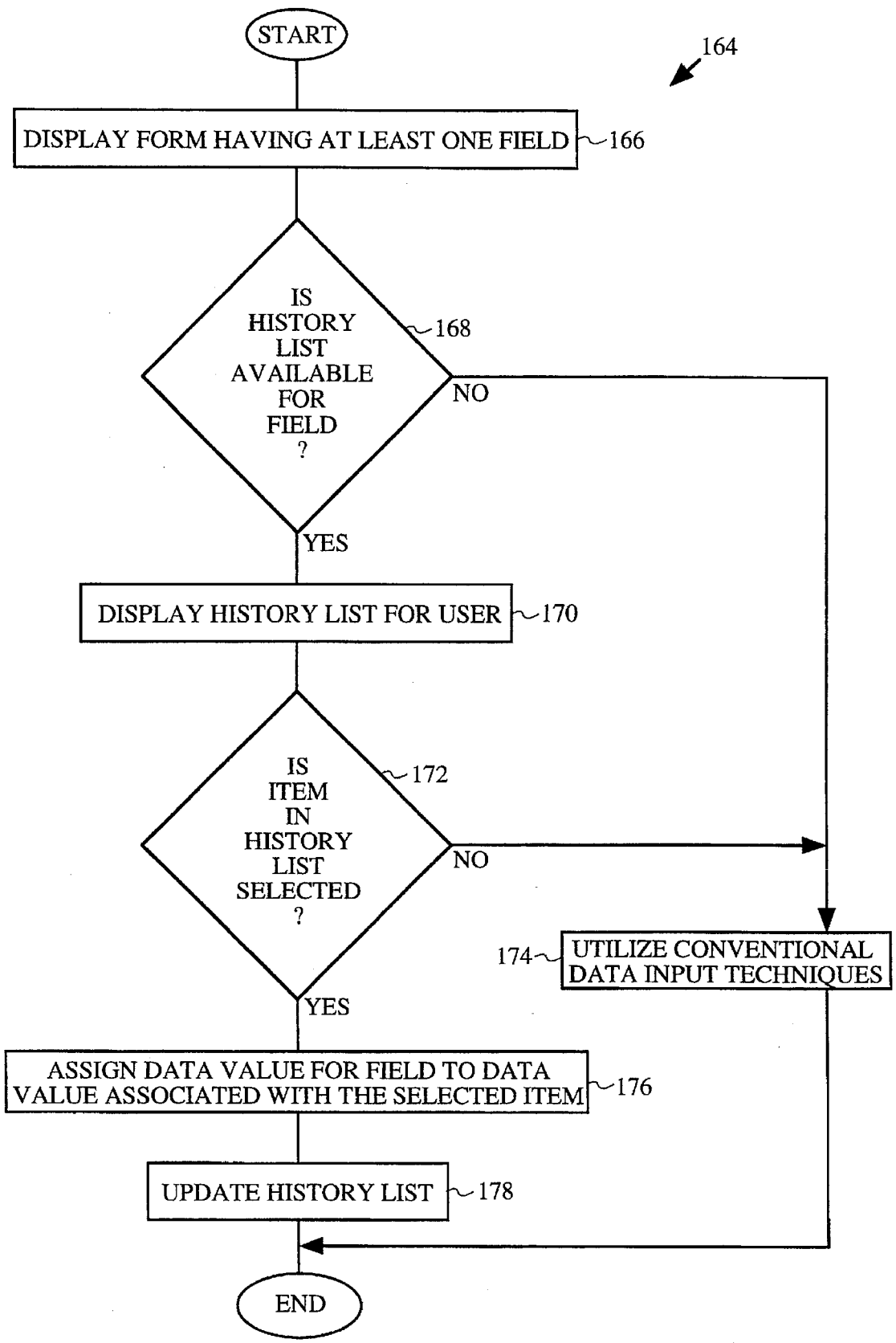
FIG. 4 is a basic block diagram of list processing associated with a basic embodiment of the invention.

FIG. 4 is a basic block diagram of list processing 164 associated with a basic embodiment of the invention. The list processing 164 is carded out by the a computer system. Preferably, the computer system is the pen-based computer system shown in FIGS. 1–3. However, most computer systems can be programmed to perform the list processing 164.

The list processing 164 begins by displaying 166 a form having at least one field. A form is an electronic image, typically of some sort of document, to which data needs to be entered into its fields. For example, in an application program such as a fax sending program running on a computer, when sending a fax, a form will be displayed to the user requesting that the user enter the name of the person to which the fax is to be sent. Another example is a electronic business card program (e.g., ROLODEX® like product) running on a computer, wherein when entering a new business acquaintance, a form will be displayed to the user requesting the name, company, address, phone, etc. of the person. The above two examples of forms are two of many types of forms that can be used with the invention. The form is displayed 166 on a display screen of the computer system. In the preferred embodiment, the display screen is the LCD screen 60 shown in FIG. 2.

After displaying 166 the form, a decision 168 is made based on whether there is a history list available for the particular field of the form. For example, if the field within the form is a name field which requests a person's name, then the decision 168 determines whether there is a history list available for the name field. The history list is a list of data values most recently and/or most frequently used for the associated field. For example, if the field is the name field, then the history list for the name field would contain the most recently and/or most frequently used names. The composition of the items within the history list is discussed in greater detail below. When decision 168 determines that there is a history list available for the particular field, then the history list is displayed 170 for the user. Preferably, the history list is displayed as a menu list to the user on the display screen in a location proximate to where the field is displayed.

Next, a decision 172 is made based on whether the user has selected an item within the history list. If the user has not selected an item within the history list, then conventional data input techniques are utilized 174 to enter the necessary data. For example, one conventional data input technique is to provide the user with an alphabetical list of numerous possible names. Here, the list is usually better than no list, but remains cumbersome because of the large size of the list and because the user has to wade through the large amount of unimportant data contained within the list. On the other hand, if the decision 172 determines that an item has been selected from the history list, then the data value for the field is assigned 176 to the data value associated with the selected item of the history list. The history list is also updated 178 to reflect the fact that the selected item was most recently selected. By updating 178 the history list, the historical information maintained in the history list for the particular field is maintained. Additional details pertaining to the updating of the history lists are described below.

FIGS. 5A and 5B are diagrams illustrating features of the invention that are displayed on a display screen of the computer system. Again, in the preferred embodiment, the display screen is the LCD screen 60 shown in FIG. 2. The application program associated with FIGS. 5A and 5B is an address book application program that is executed by the computer system and able to store and display name, address, company and phone information much the same way as a traditional paper version of an address book would. The particular application program is not important so long as the application program requires a user to complete at least one field in a form.

In FIG. 5A, a form 180 is illustrated having a name label 182 for a name field 184, as well as history list indicators 186 and 187. Additionally, the form 180 includes an address label 188, an address field 190, a company label 192, a company field 194, a phone label 196 and a phone field 198. The user can then, in accordance with the address book application program, input data into the name field 184, the address field 190, the company field 194, and the phone field 198. The history list indicator 186 is associated with the history list for the name field, and the history list indicator 187 is associated with the history list for the company field.

Consider the case in which the user has opened the form 180 in the address book application program and is now required to enter data into the fields 184, 190, 194 and 198. Of course, the user can skip some of the fields, however, this diminishes the value of the entry in the address book. In any case, when the user seeks to enter data into the name field 184, the user can click, tap or otherwise select the history list indicator 186 to obtain the history list for names. Preferably, each history list is associated with a field class. The input fields of a form then designate the field class associated therewith. Here, the field class associated with the field 184 would be "full name".

In FIG. 5B, a history list 200 is produced after the user has selected the history list indicator 186 associated with the name label 182 or name field 184 is illustrated. Here, the history list 200 is the history list associated with the field class "full name" and includes five (5) names of persons that were most recently and/or frequently used on the computer system. Moreover, an "other" region 201 can be optionally provided within the history list 200 to allow the user to select an input from a larger conventional styled list of choices when the items within the history list do not include the value needed by the user. For example, the other list could be an alphabetic list of all names known to the computer system, typically through a ROLODEX® type application program.

FIGS. 6A and 6B are history tables from which the history lists are produced. Although history tables have not been previously mentioned, the history lists that have been previously discussed are preferably produced from history tables. Each history list is associated with a history table, and each history table is associated with a field class.

In FIG. 6A, the history table 202 produces the history list 200 shown in FIG. 5B. The history table 202 includes a string/pointer section 204, a time section 206 and a number of uses section 208. The string/pointer section 204 contains either a full name or a pointer to a data record including the appropriate full name. The time section 206 includes the time that the full name was last used by the computer system. Time here refers to either calendar date, daily time, or both. The number of uses section 208 maintains a count of the number of times that the full name has been used by the computer system.

You will note that the history list 200 displayed as shown in FIG. 5B is ordered differently than the ordering of the items within the history table 202 shown in FIG. 6A. Preferably, the items within the history list 200 are ordered in a manner in which time information as well as frequency of use information are together considered in determining the ordering of the choices within the history list 200. Because the name "Diane Penn" was used last in time and is used frequently, it appears first in the history list 200. It is followed by the name "Steve Smith" because this name appears next in time and also with a substantial frequency of use. Also note that the differences between time of last use and frequency of use for the names "Diane Penn" and Steve Smith" are weighted such that the most recently used name is preferably displayed first in the history list 200. Here, in this example, the name "Diane Penn" was displayed before the name "Steve Smith" because it was the most recently used item within the table 202 and the relative difference in the frequencies of usage were not substantial enough to list them in the opposite order. Next, the name "Joe M. State" appears because it occurs next in time and its frequency of use is not so much different from the remaining items in the history table 202 to cause it to be displayed later in the history list 200. The name "Bill D. Thomas" is then displayed because it is next in time, and again not bumped down due to any other items with substantially greater frequency of uses. Lastly, the name "Mary Kay" is placed in the history list 200 because within the history table 202, the name "Mary Kay" was last in time and its frequency is not substantially greater than other entries.

FIG. 6B is a diagram illustrating a history table 210 for the company field 194 of the form 180. Although a history list produced from the history table 210 is not illustrated, it would be similar to the history list 200 shown in FIG. 5B. The history table 210 includes a string/pointer section 212, a time section 214 and a number of uses section 216. Here, unlike the time section 206, the time section 214 is illustrated as containing only a date. This is done to illustrate that the data only option is available, although it is preferable to store both time and date of last use. The ordering of the history list produced from the history table 210 depends on how the system designer prefers to display the history list for the company field 194. For example, the choice of "First National Bank" may be listed after listing the choice for "SAM Systems" even though it was later in time because the frequency of use of "SAM Systems" is substantially greater than the frequency of use of the "First National Bank." In either case, the first choice in the historical list for this example is likely to be the choice of "Apple Computer" because it is both the most recently and most frequently used item in the history table 210.

In general, the order determining for the history lists discussed above with reference to FIGS. 6A and 6B use a most recently used (MRU),approach so that the items within the list are the most probable choices that the user will desire. MRU approaches are well known to computer programming professionals. Preferably, the MRU approach utilized for order determining uses a combination of time of last use and frequency of use.

Figure 7:
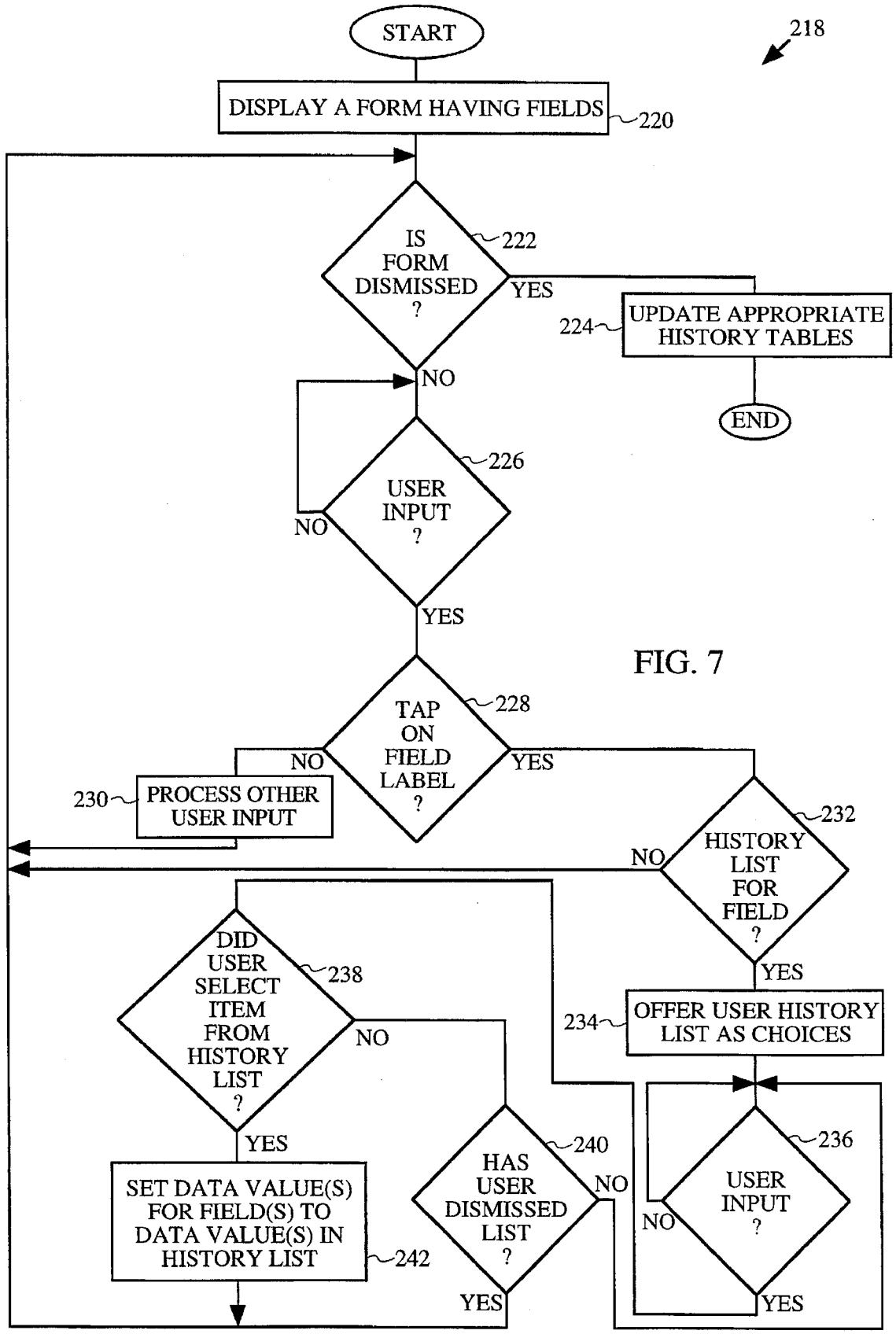
FIG. 7 is a flow chart illustrating history list processing associated with a detailed embodiment of the invention.

FIG. 7 is a flow chart illustrating history list processing 218 associated with a detailed embodiment of the invention. The history list processing 218 is preferably implemented by a programmed computer system. Preferably, the computer system is the pen-based computer system shown in FIGS. 1–3.

The history list processing 218 displays 220 a form having fields on a display screen of the computer system. Preferably, the display screen is the LCD screen 60 shown in FIG. 2 and the form is displayed using the graphical techniques discussed above with reference to FIG. 3. A decision 222 then determines whether the form has been dismissed. A form can be dismissed for numerous masons, including closing the application producing the form or completing the process associated with the form. If the decision 222 determines that the form has been dismissed, then the appropriate history tables are updated 224. The updating 224 of the history tables is described in detail below with respect to FIGS. 10–12.

On the other hand, when the decision 222 determines that the form has not been dismissed, then the history list processing 218 performs decision 226 based on whether or not user input has been received. As long as user input has not yet been received, the history list processing 218 awaits the user input. Once user input is received, a decision 228 determines whether the user has selected a history list indicator (e.g., history list indicator 186 or 187). For example, in a pen-based implementation, the selection can be made by tapping the field label or the history list indicator associated therewith. If the user has not selected a history list indicator, then the user has input some kind of request other than for history list processing; therefore, the list processing 218 processes 230 the other user input using conventional approaches and then returns to decision block 222 to repeat the processing for the next user action. Since these other processes 230 are conventional, they are not further discussed.

Alternatively, when the user has selected a history list indicator (e.g., by tapping on the associated field label or history list indicator), a decision 232 is then made based on whether there is a history list available for the field. If there is no history list available for the field, the list processing 218 returns to decision block 222 to repeat the previously described processing because the user's request for a history list is unavailable for this field. On the other hand, if there is a history list available for the field, then the history list is offered 234 to the user as input choices. The history list processing 218 then awaits the user's input at decision 236. When the decision 236 determines that the user has input some sort of data, a decision 238 is made based on whether the user has selected an item from the history list. If the user has not selected an item from the history list, then a decision 240 is made based on whether the user has dismissed the history list. The user dismisses the history list when the user inputs data other than by selecting an item from the history list. If the user has not dismissed the history list, then the history list processing 218 returns to decision block 236 to await additional data input by the user (and may prior thereto perform other conventional processing associated with the data input). If the decision 240 determines that the user has dismissed the history list, then the history list processing 218 returns to decision block 222.

On the other hand, when the decision block 238 determines that the user has selected an item from the history list, then a data value for the field is set 242 to the data value in the history list corresponding thereto. The setting 242 of the data value for the field is explained in greater detail below with respect to FIG. 9. Additionally, additional data values may also be set for other fields within the form that have data values indirectly indicated by the history list. Thereafter, the history list processing 218 returns to decision block 222 to repeat the processing.

Figure 8:
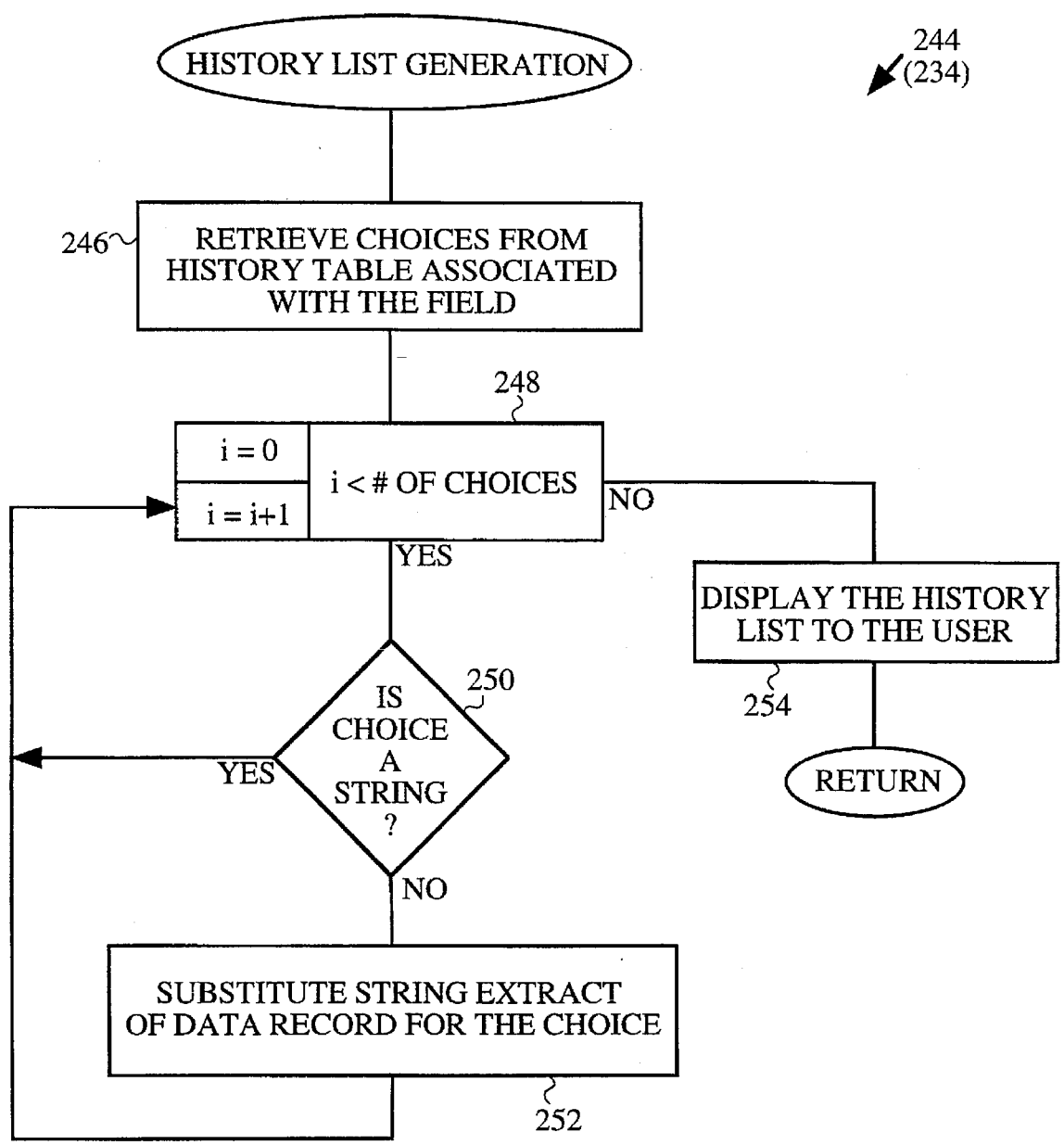
FIG. 8 is a flow chart illustrating history list generation processing.

FIG. 8 is a flow chart illustrating history list generation processing 244. This history list generation processing 244 is associated with the processing carded out by block 234 of FIG. 7.

The history list generation processing 244 retrieves 246 choices from the history table associated with the field. In the example shown in FIG. 6A, the choices (names) are obtained from the history table 202 associated with the name field. Additionally, the history list generation processing 244 can reorder the names for the history list using a weighted average of the time of last use and frequency of use information retained in the history table 202. This order determining for the history list was described above with respect to FIGS. 6A and 6B.

Next, a loop 248 is invoked to step through each of the choices within the history table. For each choice (item) within the history table, a decision 250 is first made based on whether the choice is a string. Preferably, the choice is one of a string or a data record pointer. As shown in FIGS. 6A and 6B, the regions 204, 212 contain either the data string itself or a data record pointer to the data string. The data record pointer points to a data record (i.e., location) within the computer system where information (including the needed data string) is kept. In any case, if the decision 250 determines that the choice is a string, then no additional processing is needed and processing returns to the beginning of the loop 248 to process the next item in the history table. On the other hand, if the decision block 250 determines that the choice is not a string, then a string is extracted from the appropriate data record for the choice and then substituted 252 therefor. In this case, the choice is a data record pointer to a data record and the history list generation processing 244 replaces the pointer with the data extracted from the data record pointed to by the data record pointer. For the example shown in FIG. 6A, the extracted data from the data record would be the name. Thereafter, the loop 248 again repeats for the next item within the history table. Once all the items have been considered, the history list is displayed 254 to the user. Again, the ordering of the items in the history list largely depends on implementation, though the most recently and/or most frequently use item would preferably by provided first in the history list. Also, the maximum number of elements within the history list is also preferably limited to only those choices having a reasonably good probability of being reused.

Figure 9:
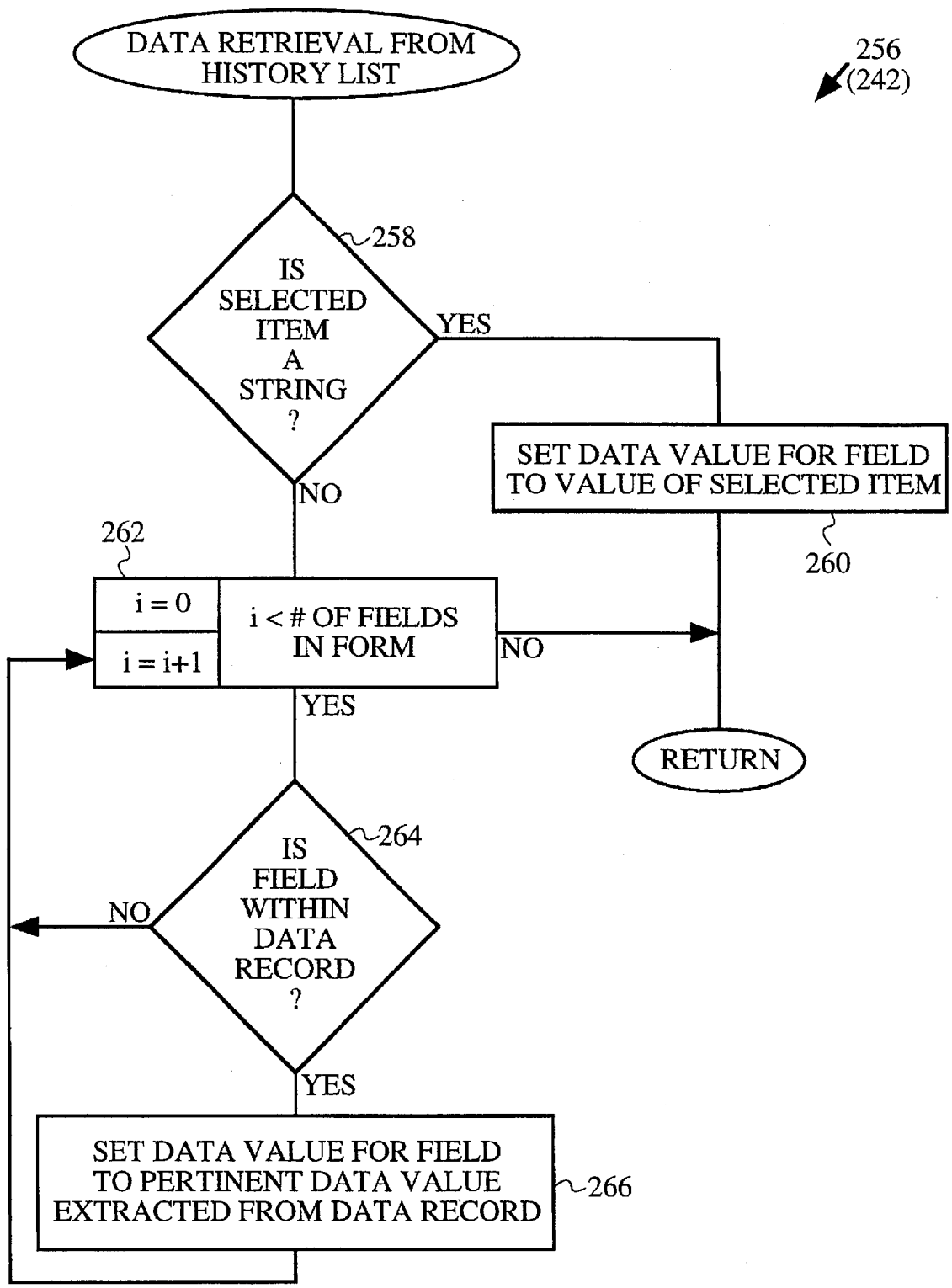
FIG. 9 is a flow chart illustrating data retrieval processing.

FIG. 9 is a flow chart of data retrieval processing 256. The data retrieval processing 256 is the processing performed by block 242 in FIG. 7.

The data retrieval processing 256 begins with a decision block 258 which determines whether the selected item is a string. If the selected item is a string, then the data value for the field is set 260 to the value of the selected item. Following block 260, the data retrieval processing 256 is complete and returns because, in this case, the item selected was a string.

On the other hand, when the decision block 258 determines that the selected item is not a string, then a loop 262 is invoked. The loop 262 scans through each field of the form and determines whether the data record can be used to extract the information needed by the field of the form. Specifically, a decision 264 is made based on whether the field of the form is within the data record. If the field is not within the data record, then the data retrieval processing 256 returns to the beginning of the loop 262 to process the next field in the form. On the other hand, if the field is within the data record, then the data value for the field is set 266 to the pertinent data value extracted from the data record. Following block 266, the data retrieval processing 256 returns to the beginning of the loop 262 to process the remaining fields in the form. Once all of the fields within the form have been considered by the loop 262, the loop 262 is complete and the data retrieval processing 256 returns.

Figure 10:
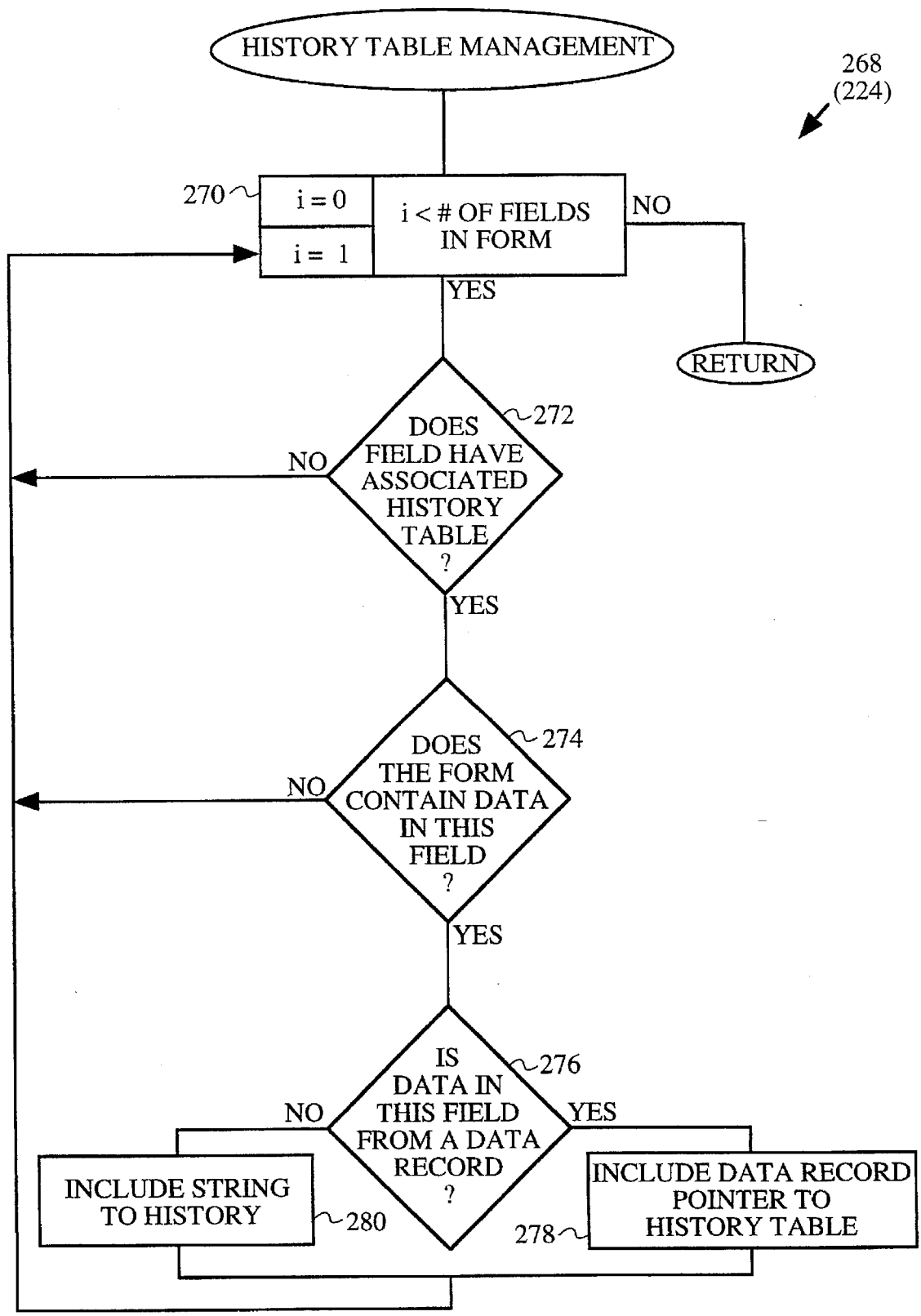
FIG. 10 is a flow chart illustrating history table management processing.

FIG. 10 is a flow chart of history table management processing 268. The history table management processing 268 is the processing performed by block 224 in FIG. 7.

The history table management processing 268 begins with a loop 270. The loop 270 scans through each of the fields in the form. The loop 270 begins with a decision 272 based on whether the field has a history table associated therewith. If the field does not have a history table associated with it, then the history table management processing 268 returns to the beginning of the loop 270 to process the next field within the form. In this case, there is no associated history table to update. On the other hand, if the decision 272 determines that the field does have a history table associated with it, then additional processing is carded out. Namely, a decision 274 determines whether the form contains data in the field currently being evaluated. If the form does not contain data in the field, then there is no updating to be performed so the history table management processing 268 returns to the beginning of the loop 270 to consider the next field within the form.

On the other hand, if the form does contain data in the field, then a decision 276 is made based on whether the data in the field is from a data record. If the data in the field is from a data record, then a data record pointer to the data record is included 278 within the history table. On the other hand, when the data in the field is not from a data record but from a string, the string is included 280 within the history table. Following either of blocks 278 or 280, the history table management processing 268 is complete for the particular field of the form being considered and processing returns to the beginning the loop 270 for consideration of the next field in the form. Once all of the fields within the form have been considered, the loop 270 ends and the history table management processing 268 is complete and returns.

Figure 11:
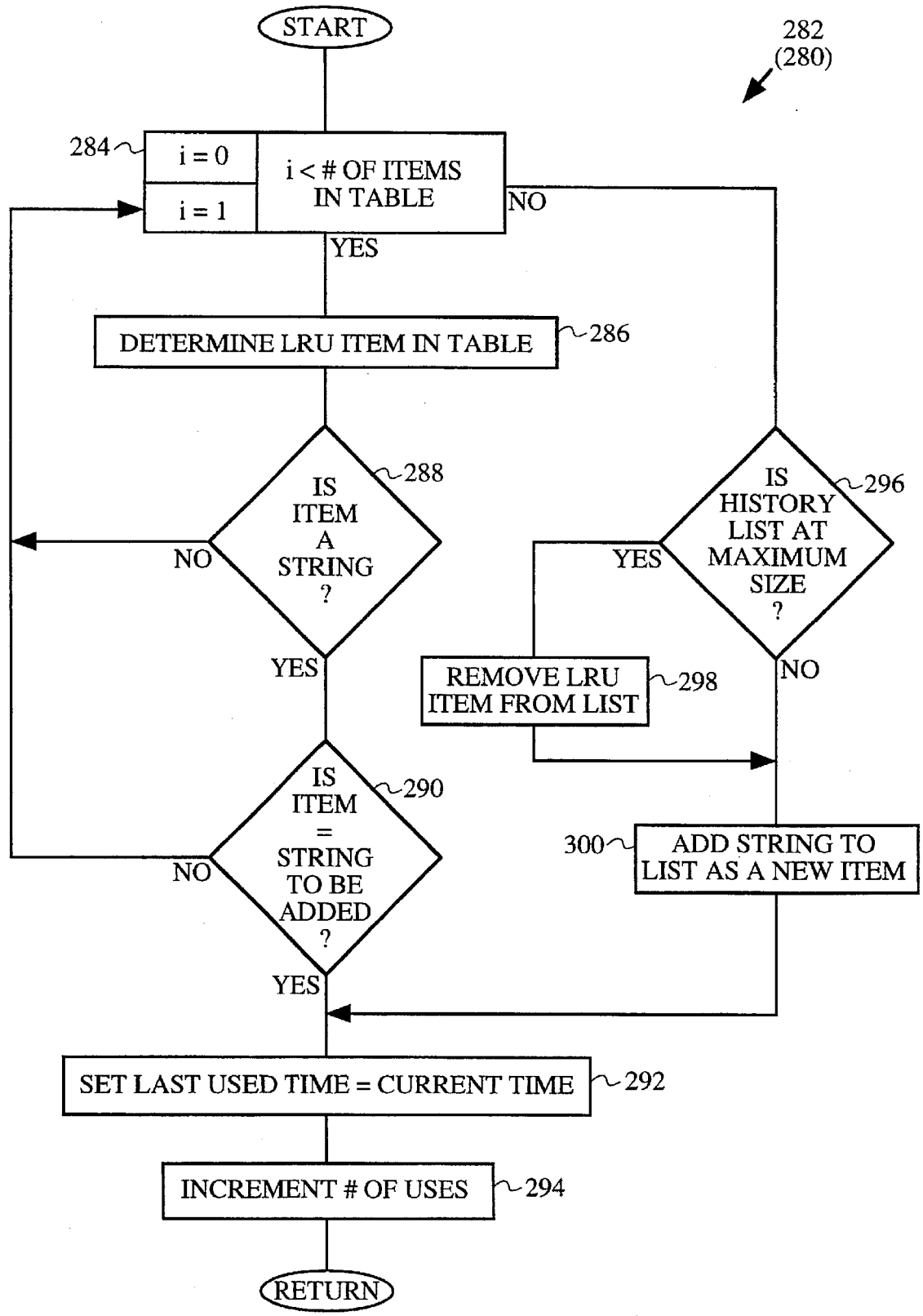
FIG. 11 is a flow chart illustrating processing associated with adding a string to a history table.

FIG. 11 is a flow chart of processing 282 associated with including or adding a string to the history table. This processing 282 is associated with block 280 in FIG. 10.

The processing 282 begins with a loop 284. The loop 284 processes each item within the history table. First, the least-recently-used (LRU) item within the history table is determined 286. The determination 286 of the LRU item is done using conventional techniques known to computer programming professionals. The techniques are also known in the computer memory arena in relation to cache memory. Also, as discussed above, the LRU determination could utilize a combination of not only least recently used but also frequency of use.

Next, a decision 288 is made based on whether the item within the history table being considered is a string. If the item is not a string, then the item is no longer processed because it is processed by block 278 of FIG. 10. On the other hand, if the item is a string, then decision 290 determines whether the item is equal to the string which is sought to be added to the history table. If the string is not equal to the item, then no further action is taken and the processing returns to block 284 to consider the next item in the history table. On the other hand, if the item is equal to the string to be added to the history table, then the last used time within the history table is set 292 to the current time and the number of uses within the history table for the item is incremented 294. Following block 294, the processing 282 is complete and returns because the history table has been updated in blocks 292 and 294.

However, in a case in which none of the items within the history table match the string to be added to the history table, the loop 284 will complete and following its completion, a decision 296 determines whether the history list is already at its maximum size. If the history list is already at its maximum size, then the LRU item is removed 298 from the history list. Following block 298 or following decision block 296 when the history list is not yet at its maximum size, the string is added 300 to the history list as a new item. Thereafter, blocks 292 and 294 are performed to set 292 the last used time and to increment 294 the number of uses. Here, the updating preferably sets the last used time to the current time and sets the number of uses to one. Again, following block 294, the processing 282 is complete and returns.

Figure 12:
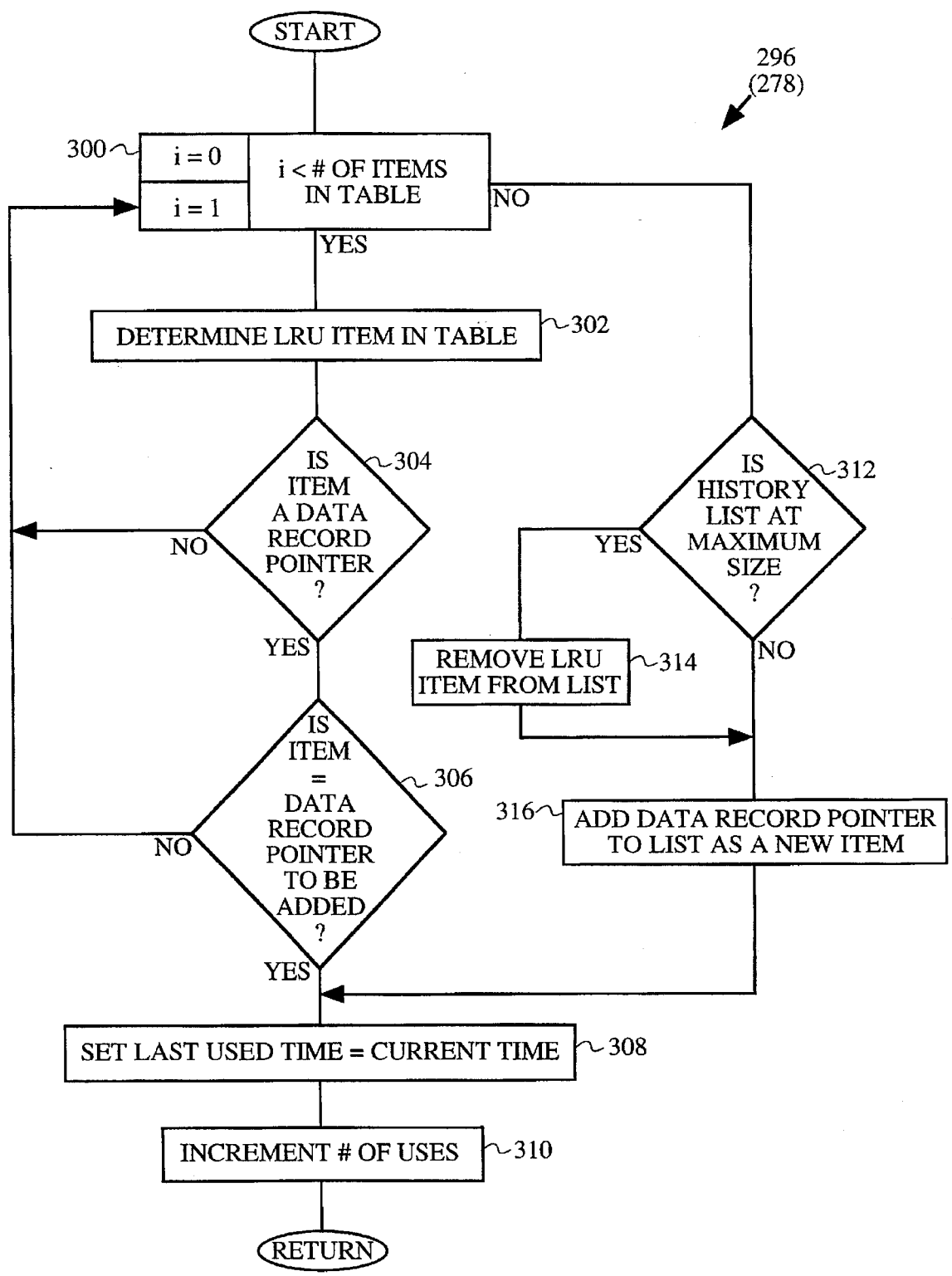
FIG. 12 is a flow chart illustrating processing associated with adding a data record pointer to a history table.

FIG. 12 is a flow chart of processing 296 associated with adding a data record pointer to the history table. The processing 296 is associated with block 278 in FIG. 10.

The processing 296 begins with a loop 300 which scans through each item within the history table to determine whether the item within the table is the same as the item sought to be added to the history table. The loop 300 begins by determining 302 the LRU item within the history table. As discussed above, LRU determinations are well-known to those skilled in the art. A decision 304 is then made based on whether the item is a data record pointer. If the item is not a data record pointer, then the processing 296 returns to the beginning of the loop 300 to process the next item in the history table because this item is processed by block 280 in FIG. 10. On the other hand, if the item is a data record pointer, then a decision 306 determines whether the item is equal to the data record pointer sought to be added to the history table. If the item does not match the data record pointer to be added to the history table, then the processing 296 returns to the beginning of the loop 300 to consider the next item in the history table. On the other hand, if the item is equal to the data record pointer to be added to the history table, then the item does not need to be physically added to the history table, but the item is itself updated to indicate the current history of its usage. Namely, the last used time is set 308 to the current time, and the number of uses is incremented 310. Following block 310, the processing 296 is complete and returns.

If the loop 300 has proceeded through each of the items in the history table and not found an item which is a data record that matches the data record to be added to the history table, then a decision 312 is performed based on whether the history list is at its maximum size. If the history list is at its maximum size, then the LRU item is removed 314 from the list. Following block 314 or following decision block 312 when the history list is not yet at its maximum size, the data record pointer is added 316 to the history list as a new item. Following block 316, the last used time is set 308 and the number of uses is incremented 310. Here, the updating preferably sets the last used time to the current time and sets the number of uses to one. Again, following block 310, the processing 296 is complete and returns.

FIGS. 13A and 13B are illustrations illustrating usage of the invention across different programming applications. FIG. 13A illustrates a phone messaging program and FIG. 13B illustrates a fax program. The phone messaging program displays a form 312 to the user requiring the user to enter information concerning the caller, the caller's phone number, and the message. In this case, the caller information is entered in a caller field 314. The caller field 314 is associated with a name class for which a history table is maintained. With the fax program, a form 316 is displayed to the user requiring the user to input information concerning to whom a fax is to be sent, from whom the fax is being sent, and any notes for the cover sheet thereof. Here, the destination for the fax is also entered in a destination field 318. The destination field 3 18 is associated with the name class. Hence, even though the phone messaging program and the fax program are different programs, the same history table is used for fields within forms associated with these programs. Thus, the history developed for a particular computer, program or user is available not only for later use by the same application, but also for later use different applications. This is beneficial because the user does not have to build a history for each particular application. Instead, the history is shared across applications so that the ease of use is improved. The history that is developed is also more reliable when shared across applications because the sample size is greater.

FIGS. 14A, 14B and 14C are illustrations of another example of the usage of the invention across different applications. In particular, FIGS. 14A and 14B are associated with an accounting software package which produces a sales invoice form 320 and a reminder bill form 324. In both forms 320 and 324, company information is needed to complete the form. In the sales invoice form 320, it is the buyer field 322 which requests the company information, and in the reminder bill form 324, it is "to" field 326 which requests the company information. Hence, within the different modules of the accounting software package, a history table developed for company names (i.e., field class= "company") can be shared amongst the different modules within the accounting software package. Also, as shown in FIG. 14C, a greeting program which sends greetings such as birthday or get well greetings to persons electronically requires input from the user to a "to" field 322 and a company field 330. Here, the company field 330 is associated with the filed class of "company," and therefore, shares the same history table as was used for the company information required in FIGS. 14A and 14B. The name field 332 is associated with the field class "name" which makes use of a different history table that maintains the history of usage of names such as was used with forms 312, 316 illustrated in FIGS. 13A and 13B.

While this invention has been described in terms of several preferred embodiments, there are alterations, permutations, and equivalents which fall within the scope of this invention. It should also be noted that there are may alternative ways of implementing the processes of the present invention. It is therefore intended that the following appended claims be interpreted as including all such alterations, permutations, and equivalents as fall within the true spirit and scope of the present invention.

What is claimed is:

1. A pen-based computer system, comprising:
   an I/O display system including at least an input tablet and a display screen;
   a memory system for storing program code and data;
   a CPU for processing the program code in accordance with the data; and
   a plurality of history tables maintained within said memory system, each of said history tables corresponding to a different field class,
   wherein when inputting data via the input tablet into a field of a form being displayed on said display screen, a list of choices is produced from said history table for the field class corresponding to the field and displayed on said display screen.

2. A pen-based computer system as recited in claim 1, wherein each of said history tables stores historical information concerning usage of data values with respect a different one of the field classes.

3. A pen-based computer system as recited in claim 2, wherein the list of choices produced from said history table is a menu list of most recently and frequently used data values for the field class.

4. A pen-based computer system as recited in claim 2, wherein when a user selects one of the choices from the list of choices, the selected choice is input into said computer system and displayed in said display screen in the field of the form.

5. A pen-based computer system as recited in claim 2, wherein said history table for the field class corresponding to the field is updated in accordance with a selected item.

6. A pen-based computer system as recited in claim 5, wherein said history tables comprise a plurality of entries, each entry including at least a data value, a time of last use, and a frequency of use.

7. A pen-based computer system as recited in claim 5, wherein the updating of said history tables causes at least one of (i) a data value to be placed in said history table and (ii) causes the time of last use and the frequency of use of one of the data values associated with the selected item to be updated.

8. A graphical user interface, comprising:
   a history list for each of a plurality of field classes;
   a form having at least one field requiring data input, the field being associated with one of the field classes; and
   a history list selector for selecting the history list for the field based on the field class associated with the field.

9. A graphical user interface as recited in claim 8, wherein said history list for each of the field classes is a menu list of most recently and frequently used data values for the field classes.

10. A graphical user interface as recited in claim 9, wherein said graphical user interface is for a pen-based computer system, and
    wherein said history list produced for each of the field classes stores historical information concerning usage of data values with respect the associated field class.

11. A method for inputting data into a computer system having a display screen associated therewith, said method comprising:
    (a) displaying a form on the display screen of the computer system, the form having at least one field associated with a field class and requiring data entry by a user;
    (b) displaying a history list associated with the field class on the display screen on the computer system;
    (c) determining whether the user has selected an item from the displayed history list;
    (d) assigning a data value for the field to that of a data value associated with the selected item when said determining (c) determines that the user has selected an item; and
    (e) updating the history list in accordance with the selected item when said determining (c) determines that the user has selected an item.

12. A method as recited in claim 11, wherein the computer system is a pointer-based computer system.

13. A method as recited in claim 11, wherein the computer system is a pen-based computer system.

14. A method as recited in claim 11, wherein the history list is a list of most recently used data values for the field class.

15. A method as recited in claim 11,
    wherein said method further comprises (f) inputting the data by some other means when said determining (c) determines that the user has not selected an item, and
    wherein said updating (e) comprises:
    (e1) determining whether the data value already exists in the history list; and
    (e2) adding the data value to the history list if the data value is determined not to exist in the history list.

16. A method for inputting data into a computer system having a display screen associated therewith, said method comprising:
    (a) providing a history table for each of a plurality of field classes;
    (b) displaying a form on the display screen of the computer system, the form having at least one field requiring data entry by a user;
    (c) producing a history list for the field on the display screen of the computer system based on the history table for the field class associated with the field;
    (d) displaying the history list produced on the display screen of the computer system;
    (e) determining whether the user has selected an item from the displayed history list;
    (f) assigning a data value for the field to that of a data value associated with the selected item from the displayed history list when said determining (e) determines that the user has selected an item from the displayed history list; and
    (g) updating the history table in accordance with the selected item when said determining (e) determines that the user has selected an item from the displayed history list.

17. A method as recited in claim 16, wherein the history table corresponding to each of the field classes includes a plurality of entries, each entry comprises a data value and usage information, and wherein said producing (c) comprises:
- (c1) identifying the history table for the field class associated with the field; and
- (c2) generating the items of the history list from the data values in the history table identified.

18. A method as recited in claim 17, wherein said generating (c2) generates the items for the history list from the data values in the history table identified, and thereafter orders the items based on the usage information associated with the data values.

19. A method as recited in claim 18, wherein the usage information comprises a time of last use and a frequency of use for each data value in the history table.

20. A method as recited in claim 17, wherein the data values within the history table correspond directly or indirectly to input values for the field.

21. A method as recited in claim 17, wherein the data values comprise one of a data string and a data pointer, and wherein the data pointer points a data record containing pertinent information.

22. A method as recited in claim 16, wherein the history table contains the most recently used data values for the field class.

23. A method as recited in claim 16, wherein said method further comprises (h) inputting the data value by some other means when said determining (c) determines that the user has not selected an item, and wherein said updating (g) comprises:
- (g1) determining whether the data value already exists in the history list; and
- (g2) adding the data value to the history table if the data value is determined not to exist in the history list.

24. A method as recited in claim 23, wherein said updating (g) further comprises:
- (g3) updating the usage information corresponding to the data value to reflect its recent usage.

25. A method as recited in claim 24, wherein the usage information comprises a time of last use and a frequency of use for each data value in the history table, and wherein said updating (g3) updates the time of last use and the frequency of use corresponding to the data value.

26. A computer readable medium containing program instructions for inputting data into a computer system having a display screen associated therewith, said computer readable medium comprising:

computer readable code devices for displaying a form on the display screen of the computer system, the form having at least one field associated with a field class and requiring data entry by a user;

computer readable code devices for displaying a history list associated with the field class on the display screen on the computer system;

computer readable code devices for determining whether the user has selected an item from the displayed history list;

computer readable code devices for assigning a data value for the field to that of a data value associated with the selected item when said determining determines that the user has selected an item; and computer readable code devices for updating the history list in accordance with the selected item when said determining determines that the user has selected an item.

* * * * *